(12) United States Patent
Matsunaga

(10) Patent No.: US 11,262,751 B2
(45) Date of Patent: Mar. 1, 2022

(54) TRAVELING CONTROL APPARATUS, TRAVELING CONTROL METHOD, AND NON-TRANSITORY COMPUTER-READABLE STORAGE MEDIUM STORING PROGRAM

(71) Applicant: HONDA MOTOR CO., LTD., Tokyo (JP)

(72) Inventor: Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 16/597,139

(22) Filed: Oct. 9, 2019

(65) Prior Publication Data
US 2020/0133264 A1 Apr. 30, 2020

(30) Foreign Application Priority Data
Oct. 26, 2018 (JP) .............................. JP2018-202059

(51) Int. Cl.
*G05D 1/00* (2006.01)
*B60W 50/14* (2020.01)
*G06K 9/00* (2022.01)

(52) U.S. Cl.
CPC ........... *G05D 1/0055* (2013.01); *B60W 50/14* (2013.01); *G06K 9/00845* (2013.01)

(58) Field of Classification Search
CPC ................ G05D 1/0055; B60W 50/14; B60W 2040/0827; B60W 2540/221; B60W 2540/225; B60W 2050/143; B60W 60/0059; B60W 30/182; G06K 9/00845
USPC .......................................................... 701/27
See application file for complete search history.

(56) References Cited

U.S. PATENT DOCUMENTS

| | | | | |
|---|---|---|---|---|
| 9,682,711 | B2 * | 6/2017 | Lee ........................ | B60W 40/09 |
| 9,688,288 | B1 * | 6/2017 | Lathrop ............... | G05D 1/0061 |
| 9,904,286 | B2 * | 2/2018 | Kozak .................. | G05D 1/0061 |
| 10,228,698 | B2 | 3/2019 | Mimura et al. | |
| 10,300,930 | B2 * | 5/2019 | Lathrop ............... | G05D 1/0061 |

(Continued)

FOREIGN PATENT DOCUMENTS

| | | | |
|---|---|---|---|
| JP | 2016-207064 A | 12/2016 | |
| JP | 2017-200786 A | 11/2017 | |

(Continued)

OTHER PUBLICATIONS

Japanese Office Action for Japanese Patent Application No. 2018-202059 dated Nov. 1, 2021 (partially translated).

*Primary Examiner* — Muhammad Shafi
(74) *Attorney, Agent, or Firm* — Thomas | Horstemeyer, LLP

(57) ABSTRACT

A traveling control apparatus comprises: a control unit configured to control traveling of a vehicle to switch between first traveling control that does not need monitoring by a driver and second traveling control that needs monitoring by the driver; and a recognition unit configured to recognize a state of the driver, wherein in a case in which traveling of the vehicle by the first traveling control is impossible, in accordance with a result of recognition by the recognition unit, the control unit performs switching from the first traveling control to the second traveling control, or executes third traveling control of making a safety margin larger than in the first traveling control without switching from the first traveling control to the second traveling control.

11 Claims, 11 Drawing Sheets

(56) References Cited

U.S. PATENT DOCUMENTS

| | | | |
|---|---|---|---|
| 10,768,619 B1* | 9/2020 | Szybalski | B60W 10/18 |
| 11,027,748 B2 | 6/2021 | Odate et al. | |
| 11,099,559 B2 | 8/2021 | Fujimura et al. | |
| 2015/0142244 A1* | 5/2015 | You | B60W 60/0053 |
| | | | 701/23 |
| 2015/0241878 A1* | 8/2015 | Crombez | B60W 30/12 |
| | | | 701/23 |
| 2017/0259832 A1* | 9/2017 | Lathrop | G05D 1/0061 |
| 2017/0315556 A1 | 11/2017 | Mimura et al. | |
| 2019/0072957 A1 | 3/2019 | Fujimura et al. | |
| 2019/0092346 A1 | 3/2019 | Odate et al. | |
| 2020/0017124 A1* | 1/2020 | Camhi | G06N 20/00 |

FOREIGN PATENT DOCUMENTS

| | | |
|---|---|---|
| JP | 2017-207955 A | 11/2017 |
| WO | 2017/168541 A1 | 10/2017 |

\* cited by examiner

TRAVELING CONTROL APPARATUS, TRAVELING CONTROL METHOD, AND NON-TRANSITORY COMPUTER-READABLE STORAGE MEDIUM STORING PROGRAM

CROSS-REFERENCE TO RELATED APPLICATION(S)

This application claims priority to and the benefit of Japanese Patent Application No. 2018-202059 filed on Oct. 26, 2018, the entire disclosure of which is incorporated herein by reference.

BACKGROUND OF THE INVENTION

Field of the Invention

The present invention relates to a traveling control apparatus for controlling traveling of a vehicle, a traveling control method, and a non-transitory computer-readable storage medium storing a program.

Description of the Related Art

In automated driving that controls some or all of driving operations of a driver, the state of the control is switched in accordance with the traveling region of a vehicle. Japanese Patent Laid-Open No. 2016-207064 describes outputting a voice guidance (for example, "please decelerate (accelerate)") to shift to a state in which an execution enable condition is satisfied in a case in which an execution restricted section that is a conditional execution section approaches in front of a vehicle.

In Japanese Patent Laid-Open No. 2016-207064, since deceleration (acceleration) is needed in accordance with the voice guidance, the driver is involved greatly. Depending on the traveling situation, the state of control needs to be switched without changing the state of the driver.

SUMMARY OF THE INVENTION

The present invention provides a traveling control apparatus capable of switching the state of traveling control of a vehicle without changing the state of a driver, a traveling control method, and a non-transitory computer-readable storage medium storing a program.

The present invention in its first aspect provides a traveling control apparatus comprising: a control unit configured to control traveling of a vehicle to switch between first traveling control that does not need monitoring by a driver and second traveling control that needs monitoring by the driver; and a recognition unit configured to recognize a state of the driver, wherein in a case in which traveling of the vehicle by the first traveling control is impossible, in accordance with a result of recognition by the recognition unit, the control unit performs switching from the first traveling control to the second traveling control, or executes third traveling control of making a safety margin larger than in the first traveling control without switching from the first traveling control to the second traveling control.

The present invention in its second aspect provides a traveling control method executed in a traveling control apparatus, comprising: controlling traveling of a vehicle to switch between first traveling control that does not need monitoring by a driver and second traveling control that needs monitoring by the driver; and recognizing a state of the driver, wherein in a case in which traveling of the vehicle by the first traveling control is impossible, in the controlling the traveling of the vehicle, in accordance with a result of recognition of the state of the driver, switching from the first traveling control to the second traveling control is performed, or third traveling control of making a safety margin larger than in the first traveling control is executed without switching from the first traveling control to the second traveling control.

The present invention in its third aspect provides a non-transitory computer-readable storage medium storing a program configured to cause a computer to operate to: control traveling of a vehicle to switch between first traveling control that does not need monitoring by a driver and second traveling control that needs monitoring by the driver; and recognize a state of the driver, wherein in a case in which traveling of the vehicle by the first traveling control is impossible, in the control of the traveling of the vehicle, in accordance with a result of recognition of the state of the driver, switching from the first traveling control to the second traveling control is performed, or third traveling control of making a safety margin larger than in the first traveling control is executed without switching from the first traveling control to the second traveling control.

According to the present invention, it is possible to switch the state of traveling control of a vehicle without changing the state of a driver.

DESCRIPTION OF THE EMBODIMENTS

Figure 1:
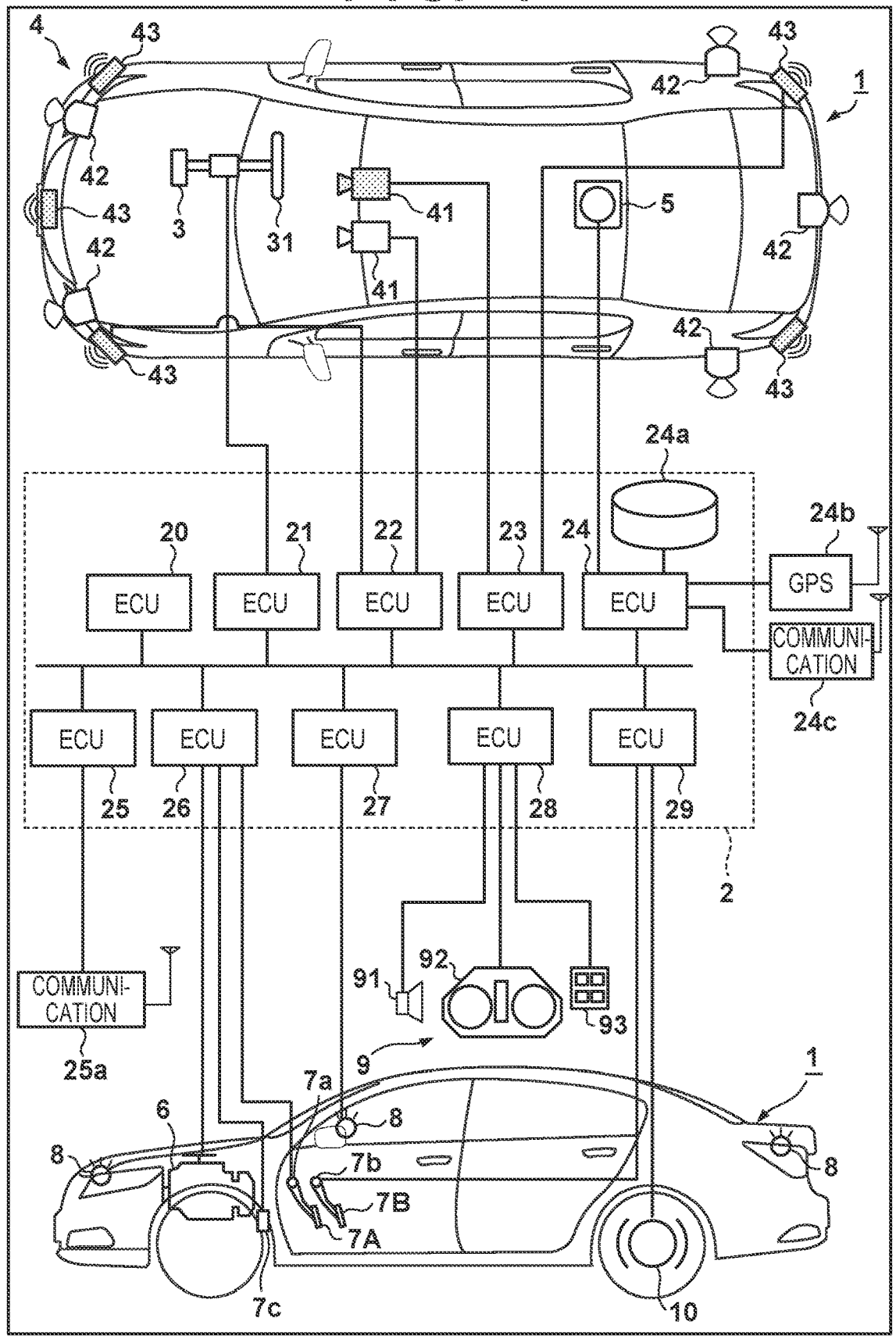
FIG. 1 is a view showing the arrangement of a vehicle control apparatus.

Hereinafter, embodiments will be described in detail with reference to the accompanying drawings. It should be noted that the following embodiments are not intended to limit the scope of the appended claims, and that not all the combinations of features described in the embodiments are necessarily essential to the present invention. Of a plurality of features described in the embodiments, two or more features may arbitrarily be combined. In addition, the same reference numerals denote the same or similar parts, and a repetitive description will be omitted.

FIG. 1 is a block diagram of a vehicle control apparatus (traveling control apparatus) according to an embodiment of the present invention, and a vehicle 1 is controlled. Referring to FIG. 1, an outline of the vehicle 1 is shown in a plan view and a side view. As an example, the vehicle 1 is a sedan-type four-wheeled vehicle.

The control apparatus shown in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. In addition, the arrangement of the control apparatus shown in FIG. 1 can be a computer that executes the present invention according to a program.

The functions and the like provided by the ECUs 20 to 29 will be described below. Note that the number of ECUs and the provided functions can appropriately be designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the advancing direction of the vehicle 1.

The ECUs 22 and 23 perform control of detection units 41 to 43 that detect the peripheral status of the vehicle and information processing of detection results. The detection unit 41 is a camera (to be sometimes referred to as the camera 41 hereinafter) that captures the front side of the vehicle 1. In this embodiment, the cameras 41 are attached to the windshield inside the vehicle cabin at the roof front of the vehicle 1. When images captured by the cameras 41 are analyzed, the contour of a target or a division line (a white line or the like) of a lane on a road can be extracted.

The detection unit 42 is a light detection and ranging (LIDAR), and detects a target around the vehicle 1 or measures the distance to a target. In this embodiment, five detection units 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each detection unit 42 and information processing of detection results. The ECU 23 performs control of the other camera 41 and each radar 43 and information processing of detection results. Since two sets of devices that detect the peripheral status of the vehicle are provided, the reliability of detection results can be improved. In addition, since detection units of different types such as cameras and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (blinkers). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by a voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified. In this embodiment, the display device 92 includes a navigation device.

An input device 93 is a switch group that is arranged at a position where the driver can perform an operation and used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

<Control Example>

Control executed by the ECU 20 in association with automated driving of the vehicle 1 will be described. When the driver instructs a destination and automated driving, the ECU 20 automatically controls traveling of the vehicle 1 to the destination in accordance with a guidance route searched by the ECU 24. In the automatic control, the ECU 20 acquires information concerning the peripheral status of the vehicle 1 from the ECUs 22 and 23, and makes instructions for the ECUs 21, 26, and 29 based on the acquired information, thereby controlling steering and acceleration/deceleration of the vehicle 1.

Figure 2:
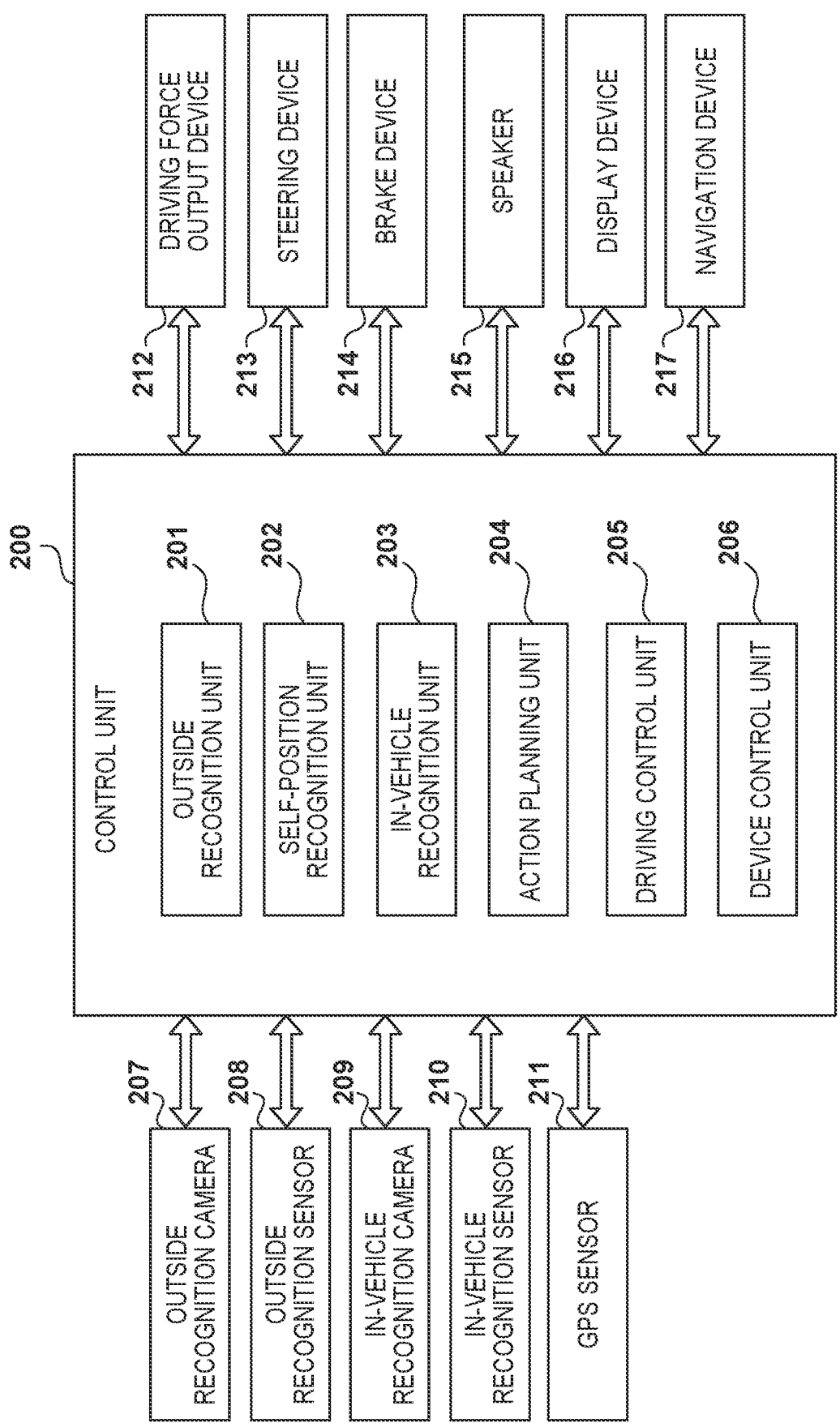
FIG. 2 is a view showing the functional blocks of a control unit.

FIG. 2 is a view showing the functional blocks of the control unit 2. A control unit 200 corresponds to the control unit 2 shown in FIG. 1, and includes an outside recognition unit 201, a self-position recognition unit 202, an in-vehicle recognition unit 203, an action planning unit 204, a driving control unit 205, and a device control unit 206. Each block is implemented by one ECU or a plurality of ECUs shown in FIG. 1.

The outside recognition unit 201 recognizes the outside information of the vehicle 1 based on signals from an outside recognition camera 207 and an outside recognition sensor 208. Here, the outside recognition camera 207 is, for example, the camera 41 shown in FIG. 1, and the outside recognition sensor 208 is, for example, the detection unit 42 or 43 shown in FIG. 1. The outside recognition unit 201 recognizes, for example, a scene of an intersection, a railroad crossing, or the like, a space on a road shoulder or the like, and the state (the speed or advancing direction) of another vehicle based on the signals from the outside recognition camera 207 and the outside recognition sensor 208. The self-position recognition unit 202 recognizes the current position of the vehicle 1 based on a signal from the GPS sensor 211. Here, the GPS sensor 211 corresponds to, for example, the GPS sensor 24b shown in FIG. 1.

The in-vehicle recognition unit 203 recognizes the occupant of the vehicle 1 and the state of the occupant based on signals from an in-vehicle recognition camera 209 and an in-vehicle recognition sensor 210. The in-vehicle recognition camera 209 is, for example, a near-infrared camera installed on the display device 92 in the vehicle 1, and detects, for example, the direction of light of sight of the occupant. Additionally, the in-vehicle recognition sensor 210 is a sensor that detects, for example, a biomedical signal of the occupant and detects a heart rate. Based on the signals, the in-vehicle recognition unit 203 recognizes the drowsy state of the occupant, a state in which the occupant is doing a work other than driving, and the like. In this embodiment, a state in which the occupant can drive is called an awakening state, and a state in which the occupant cannot drive is called a non-awakening state. The non-awakening state is, for example, an asleep state. In addition, the state in which the occupant can drive includes a state in which the occupant can monitor the vehicle system shown in FIG. 1 in response to a request from the vehicle system and a state in which the occupant can drive the vehicle as a driving subject.

The action planning unit 204 plans an action of the vehicle 1 such as an optimum route and a risk avoidance route based on the recognition results of the outside recognition unit 201 and the self-position recognition unit 202. The action planning unit 204 performs, for example, entry determination or behavior prediction of another vehicle based on the starting point or end point of an intersection, a railroad crossing, or the like. The driving control unit 205 controls a driving force output device 212, a steering device 213, and a brake device 214 based on the action plan by the action planning unit 204. Here, the driving force output device 212 corresponds to, for example, the power plant 6 shown in FIG. 1, the steering device 213 corresponds to the electric power steering device 3 shown in FIG. 1, and the brake device 214 corresponds to the brake device 10.

The device control unit 206 controls a device connected to the control unit 200. For example, the device control unit 206 controls a speaker 215 and causes it to output a predetermined voice message such as a message for warning or navigation. Additionally, for example, the device control unit 206 controls a display device 216 and causes it to display a predetermined interface screen. The display device 216 corresponds to, for example, the display device 92. In addition, for example, the device control unit 206 controls a navigation device 217 and acquires setting information in the navigation device 217.

The control unit 200 may include a functional block other than those shown in FIG. 2 as needed, and may include, for example, an optimum route calculation unit that calculates an optimum route to a destination based on map information acquired via the communication device 24c. In addition, the control unit 200 may acquire information from a device other than the cameras and the sensors shown in FIG. 2, and may acquire the information of another vehicle via, for example, the communication device 25a.

The states of automated driving control of the vehicle 1 according to this embodiment will be described here. Table 1 is a table for explaining the definition of each state of automated driving control according to this embodiment. Note that state 0 is manual driving control by the driver, although not shown in Table 1. The states of automated driving control are divided into a plurality of stages in accordance with the driving subject, the surroundings monitoring duty of the driver, and the steering wheel grip duty of the driver.

TABLE 1

| State of control | Driving subject | System monitoring duty of driver | Peripheral environment monitoring duty of driver | Necessity of steering wheel grip by driver |
| --- | --- | --- | --- | --- |
| State 4 | vehicle system | unnecessary | unnecessary | unnecessary |
| State 3 | vehicle system | necessary | unnecessary | unnecessary |
| State 2-2 | driver | necessary | necessary | unnecessary |
| State 2-1 | driver | necessary | necessary | necessary |
| State 1 | driver | necessary | necessary | necessary |

In state 2-1, the driving subject of the vehicle is the driver, and both the surroundings monitoring duty of the driver and the steering wheel grip of the driver are necessary. State 2-1 is applied in, for example, a merging/branching road scene to an expressway main lane. In state 2-2, the driving subject of the vehicle is the driver, and the surroundings monitoring duty of the driver is necessary. However, in state 2-2, the steering wheel grip of the driver is unnecessary. State 2-2 is applied in, for example, an expressway main lane scene (non-congested).

In state 3, the driving subject of the vehicle is the vehicle system shown in FIG. 1, and both the peripheral environment monitoring duty of the driver and the steering wheel grip of the driver are unnecessary. However, to prepare for a warning notification in case of a fault in the vehicle system, the vehicle system monitoring duty of the driver is needed. State 3 is applied in, for example, an expressway main lane scene (congested).

Additionally, a case in which only vertical direction control or horizontal direction control of the vehicle is performed is defined as state 1. Here, vertical direction control is, for example, ACC (Adaptive Cruise Control), and horizontal direction control is, for example, LKAS (Lane Keeping Assistant System). In state 1, the driving subject of the vehicle is the driver, and both the surroundings monitoring duty of the driver and the steering wheel grip of the driver are necessary.

In state 4, the driving subject of the vehicle is the vehicle system shown in FIG. 1, and both the surroundings monitoring duty of the driver and the steering wheel grip of the driver are unnecessary. Additionally, in state 4, the vehicle system monitoring duty of the driver is also unnecessary. That is, in state 4, for example, the asleep state (non-awakening state) of the driver is permitted.

In this embodiment, extra state 4 is further defined in addition to state 4. Extra state 4 indicates a control state in which when the vehicle travels in state 4 through a traveling enable area of state 4 and leaves the traveling enable area, the safety margin of vehicle traveling is made larger than in state 4, thereby enabling traveling while keeping the driver in the non-awakening state. At this time, the traveling enable area of extra state 4 may be designated in advance. Even if the traveling enable area is not designated, it is only necessary to enable shift of control from state 4 to extra state 4. Making the traveling margin of vehicle traveling large is, for example, lowering the traveling speed of the vehicle, increasing the distance from another vehicle, or increasing the control level of lane keeping.

Figure 3A:
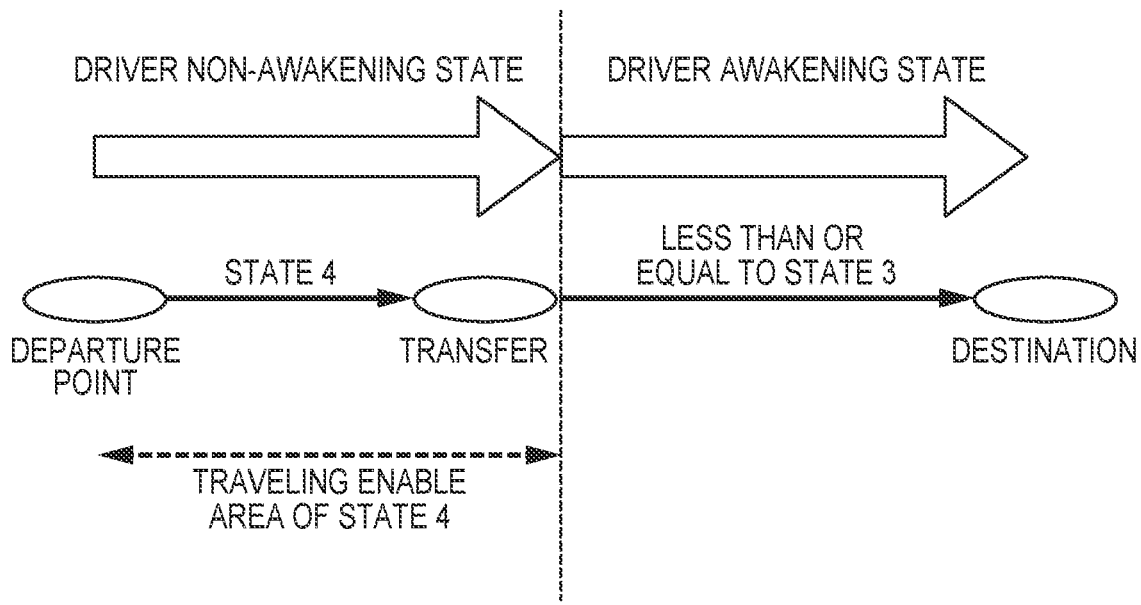
FIGS. 3A and 3B are views for explaining the transition of the state of traveling control.
Figure 3B:
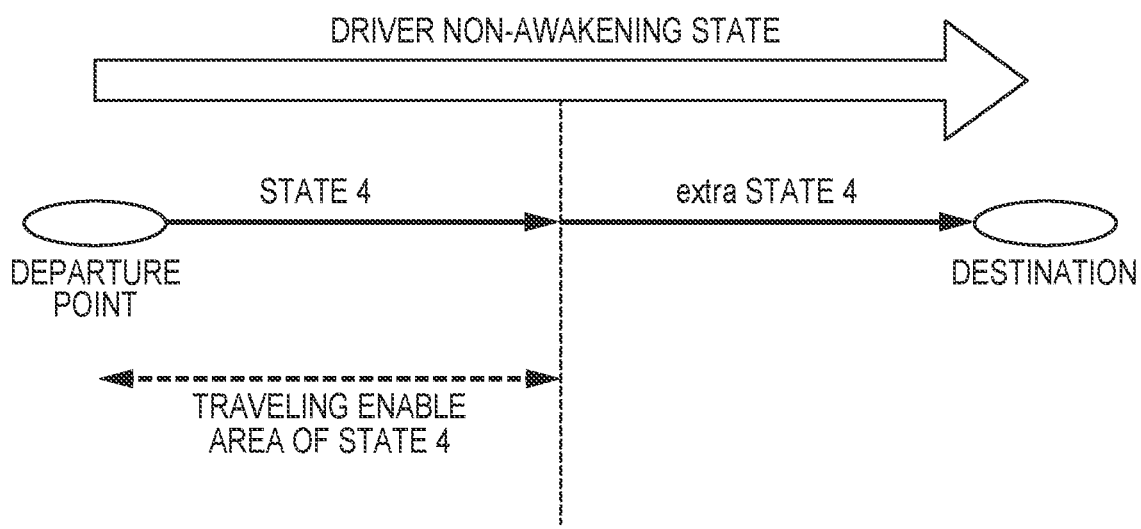

FIGS. 3A and 3B are views for explaining the transition of the state of traveling control according to this embodiment. FIG. 3A shows a case in which the vehicle 1 travels in state 4 from a departure point through a traveling enable area of state 4, the vehicle 1 then leaves the traveling enable area of state 4, and traveling in state 4 is disabled. Note that when traveling in state 4, the driver is assumed to be in the non-awakening state. In FIG. 3A, in the traveling up to the destination, the vehicle 1, for example, makes a warning to the driver in a predetermined area before leaving the traveling enable area of state 4, thereby transferring the driving subject to the driver or requesting the driver to monitor the vehicle system. After such transfer or request, the state of control of the vehicle 1 is changed, and traveling is performed up to the destination. That is, the driver changes from the non-awakening state to the awakening state upon leaving the traveling enable area of state 4. Note that in this embodiment, transfer of the driving subject to the driver and the request of monitoring of the vehicle system to the driver are equivalent in a sense of increasing the degree of involvement of the driver from the non-awakening state, and therefore, the transfer of the driving subject to the driver will be described as an example.

On the other hand, in this embodiment, as one of the states of control of the vehicle 1, an extra state 4 is provided. In this embodiment, as shown in FIG. 3B, when moving from the traveling enable area of state 4 to the traveling enable area of extra state 4, the state of control of the vehicle 1 changes from state 4 to extra state 4. At this time, if a condition is satisfied, transfer of the driving subject to the driver is not performed. As a result, the driver can maintain the non-awakening state.

Figure 4:
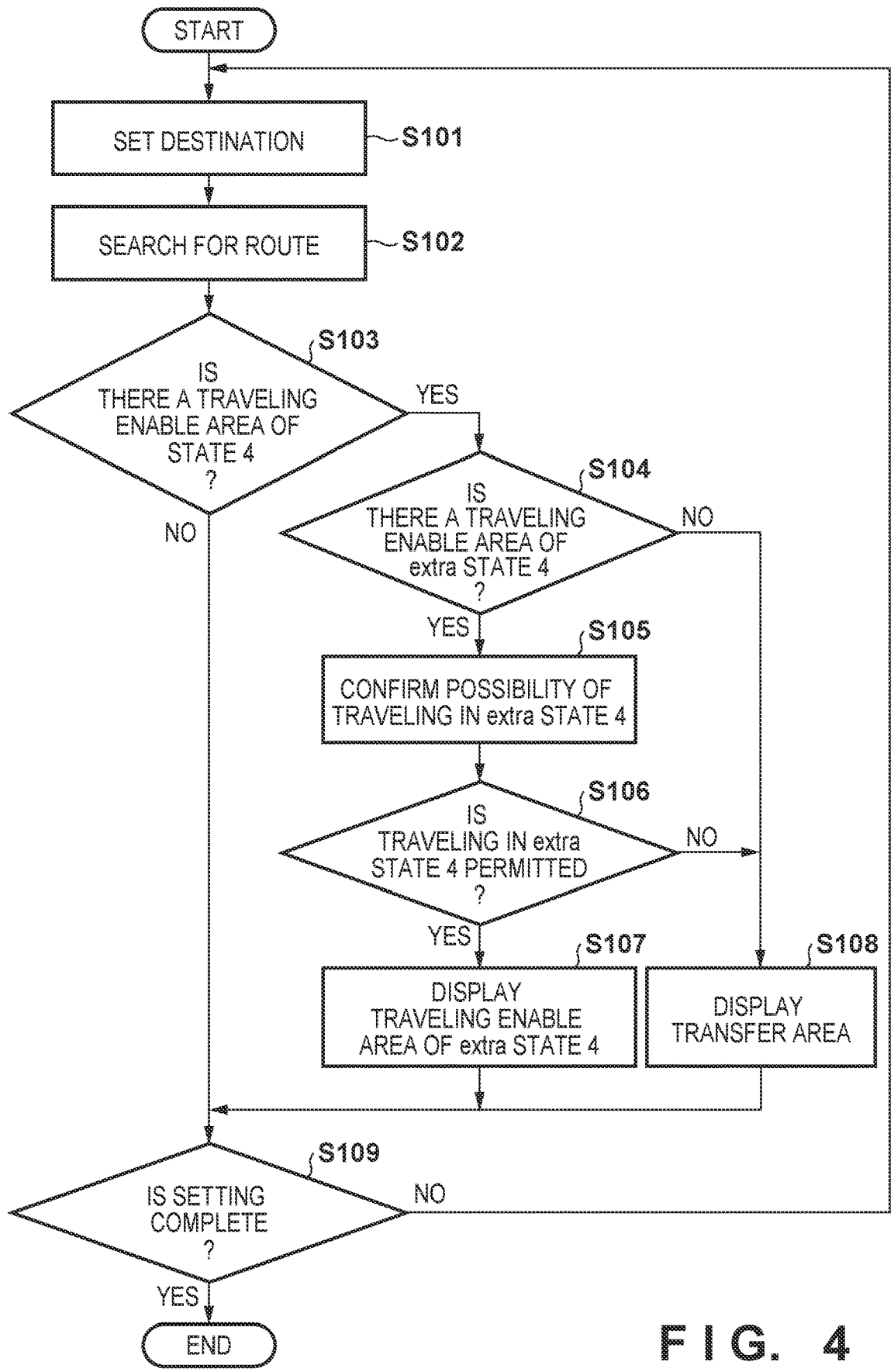
FIG. 4 is a flowchart showing setting processing performed before vehicle traveling.

FIG. 4 is a flowchart showing setting processing performed before traveling of the vehicle 1. The processing shown in FIG. 4 is implemented by, for example, the ECU that forms the control unit 200. In addition, the processing shown in FIG. 4 is performed, for example, when the driver gets in the vehicle 1, and a route is set by the navigation device 217 provided in the vehicle 1 before the start of traveling.

In step S101, the control unit 200 accepts the setting of a destination. In step S102, the control unit 200 searches for a route from the current place to the destination. In steps S101 and S102, for example, inputs to regions 1001 and 1002 of a setting screen 1000 shown in FIG. 10 to be described later are accepted, and an execute button 1012 is pressed. In step S103, the control unit 200 determines the presence/absence of a traveling enable area of state 4 in the route found in step S102. The control unit 200 may determine the presence/absence of a traveling enable area from, for example, map information acquired via the communication device 24c. Here, if it is determined that a traveling enable area of state 4 does not exist, the process advances to step S109, and the control unit 200 determines whether the route setting is completed. For example, when an OK button 1011 is pressed on the setting screen 1000, the processing shown in FIG. 4 is ended. On the other hand, for example, when a condition change button 1010 is pressed, the processing from step S101 is repeated.

Upon determining in step S103 that a traveling enable area of state 4 exists, in step S104, the control unit 200 determines the presence/absence of a traveling enable area of extra state 4. The control unit 200 may determine the presence/absence of a traveling enable area from, for example, map information acquired via the communication device 24c. Here, if it is determined that a traveling enable area of extra state 4 exists, in step S105, the control unit 200 confirms information representing whether traveling in extra state 4 is permitted by the driver.

Figure 10:
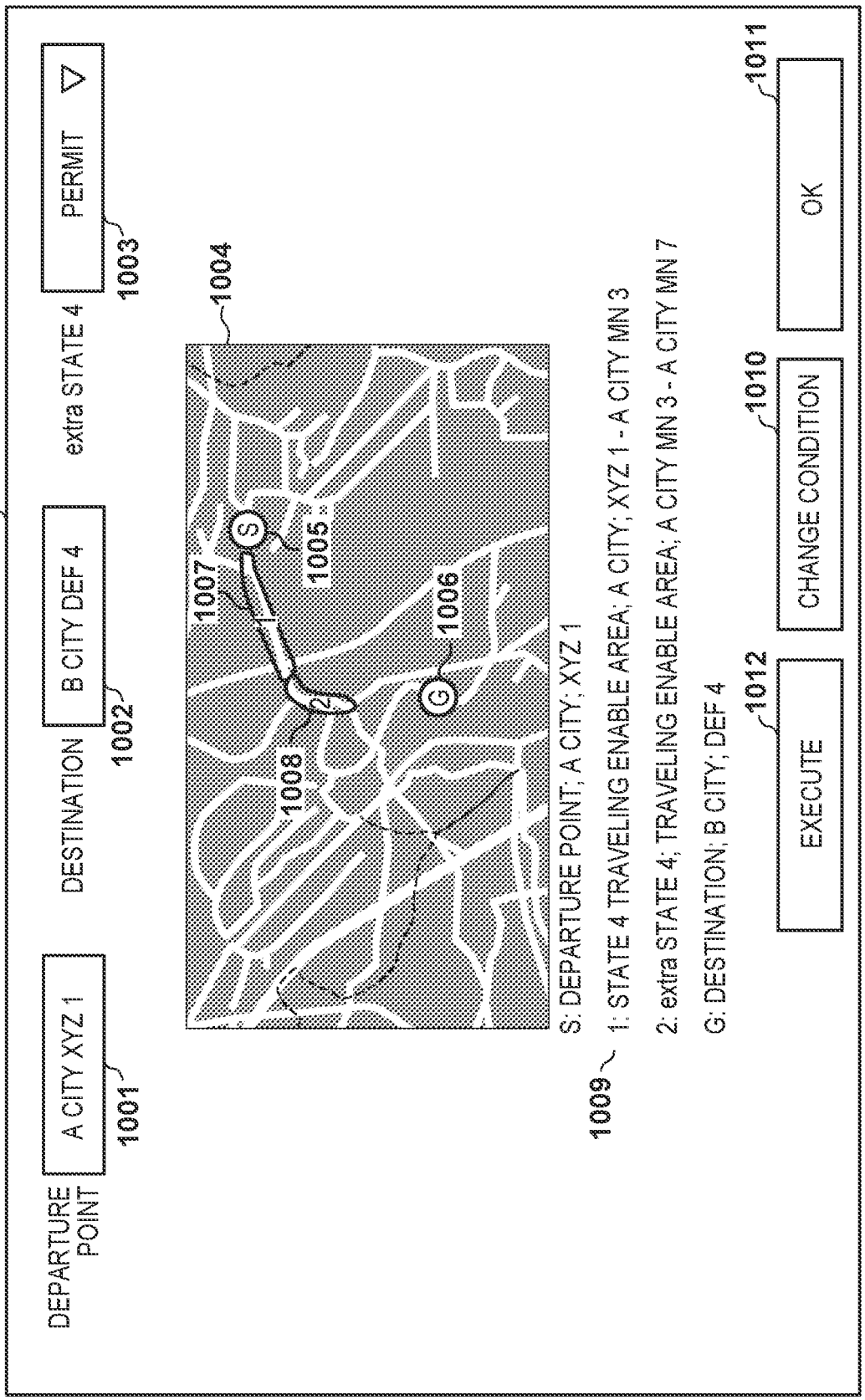
FIG. 10 is a view showing a setting screen.

The setting screen 1000 displayed for the driver when performing the processing shown in FIG. 4 will be described here. FIG. 10 is a view showing an example of the setting screen 1000 displayed for the driver. The setting screen 1000 in FIG. 10 is displayed as, for example, a part of a navigation setting screen. The region 1001 is a region where departure point information is input by the driver, and the region 1002 is a region where destination information is input by the driver. Note that the current position of the vehicle 1 may automatically be set as the departure point information in the region 1001 without the operation of the driver. A region 1003 is a region where a designation of whether to permit traveling in extra state 4 in the traveling enable area of extra state 4 is accepted. As described with reference to FIGS. 3A and 3B, in a case in which the vehicle leaves the traveling enable area of state 4 and travels in the traveling enable area of extra state 4, the driver can maintain the non-awakening state if a condition is satisfied. Hence, in extra state 4, to increase the safety margin, for example, the speed is made lower than that at the time of traveling in state 4. However, the driver may prefer avoiding a delay to the destination by interrupting the asleep state and driving the vehicle by himself/herself rather than continuing the asleep state while ensuring the safety margin at a low speed. In such a case, the driver sets "not permit" in the region 1003. In step S105, the control unit 200 confirms the set contents in the region 1003.

In step S106, the control unit 200 determines, based on the set contents in the region 1003, whether traveling in extra state 4 is permitted. Here, upon determining that traveling in extra state 4 is permitted, in step S107, the control unit 200 displays the traveling enable area of extra state 4. After step S107, the process advances to step S109.

A region 1004 shown in FIG. 10 is a screen showing an area including the found route. A mark 1005 is displayed at a position corresponding to the departure point (current place) input in the region 1001. A mark 1006 is displayed at a position corresponding to the destination input in the region 1002. A region 1007 represents the traveling enable area of state 4. In addition, a region 1008 represents the traveling enable area of extra state 4. A region 1009 displays the position information of the marks 1005 and 1006 and the regions 1007 and 1008. When the execute button 1012 is pressed after the input to the regions 1001 to 1003, the region 1004 is displayed. When the condition change button 1010 is pressed, the set contents in the regions 1001 to 1003 are canceled. When the OK button 1011 is pressed, the set contents in the setting screen 1000 are determined.

Upon determining in step S104 that a traveling enable area of extra state 4 does not exist, or upon determining in step S106 that traveling in extra state 4 is not permitted, in step S108, the control unit 200 displays an area to transfer the driving subject to the driver. In step S108, for example, as shown in FIG. 11, an area to transfer the driving subject to the driver is displayed.

Figure 11:
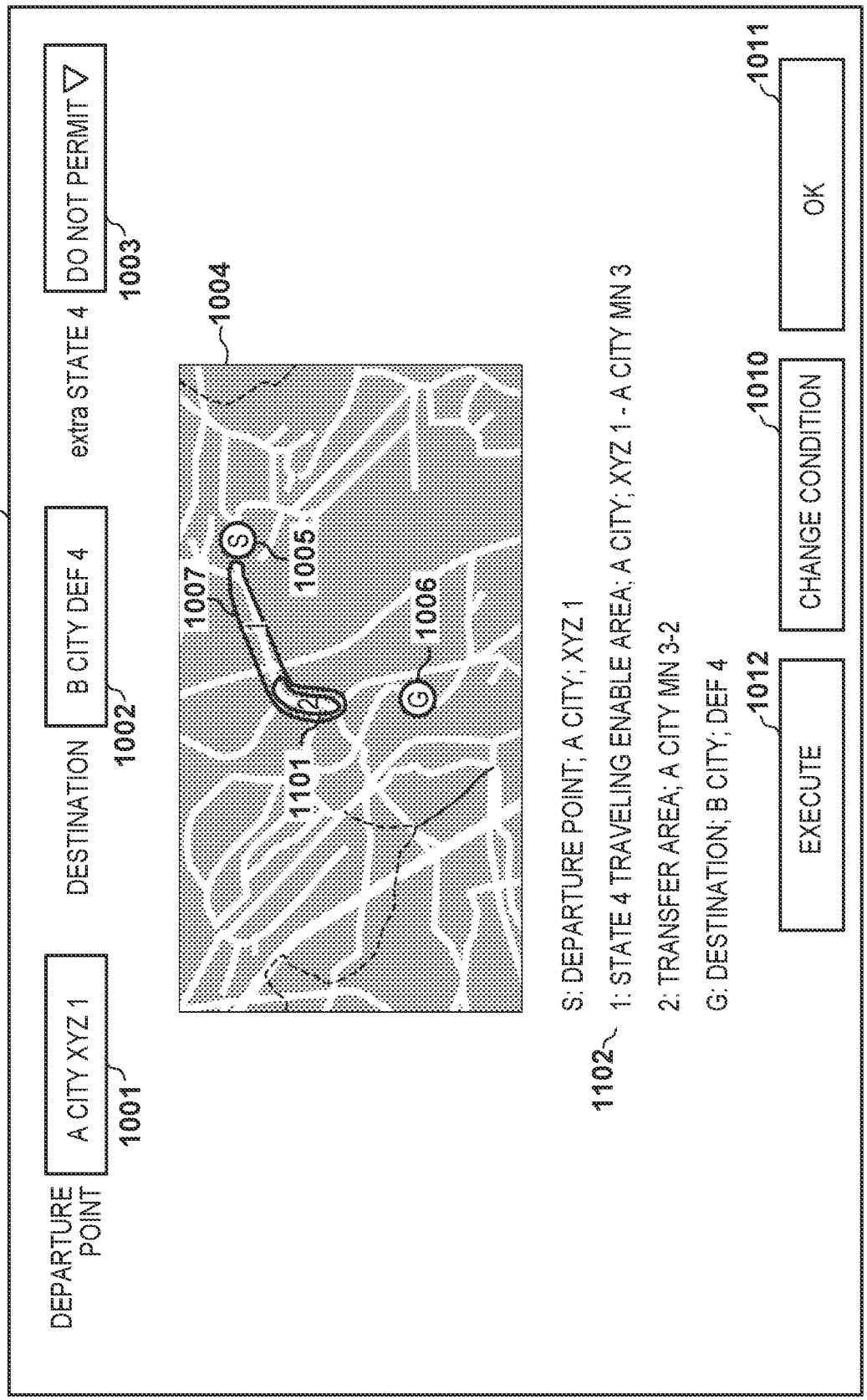
FIG. 11 is a view showing a setting screen.

FIG. 11 is a view showing an example of the setting screen 1000 displayed for the driver in a case in which traveling in extra state 4 is not permitted. As shown in FIG. 11, "not permit" is set in the region 1003. When the execute button 1012 is pressed for the set contents, a region 1101 included in the region 1007 is displayed. Here, the region 1101 is the traveling enable area of state 4 including the traveling enable area of extra state 4 in FIG. 10. In addition, in the region 1101, the driving subject is transferred to the driver in the region 1007. That is, when entering the region 1101 that is the traveling enable area of state 4, a state in which the driving subject is transferred to the driver is obtained. In a region 1102, the position information of the region 1101 is displayed together with those of the marks 1005 and 1006 and the region 1007.

Processing executed when the setting is done by the setting processing shown in FIG. 4 and, after that, traveling of the vehicle 1 is started, and the vehicle is traveling in the traveling enable area of state 4 will be described next. Additionally, in this embodiment, the traveling enable area of extra state 4 is assumed to be set such that it is adjacent to the traveling enable area of state 4.

Figure 5:
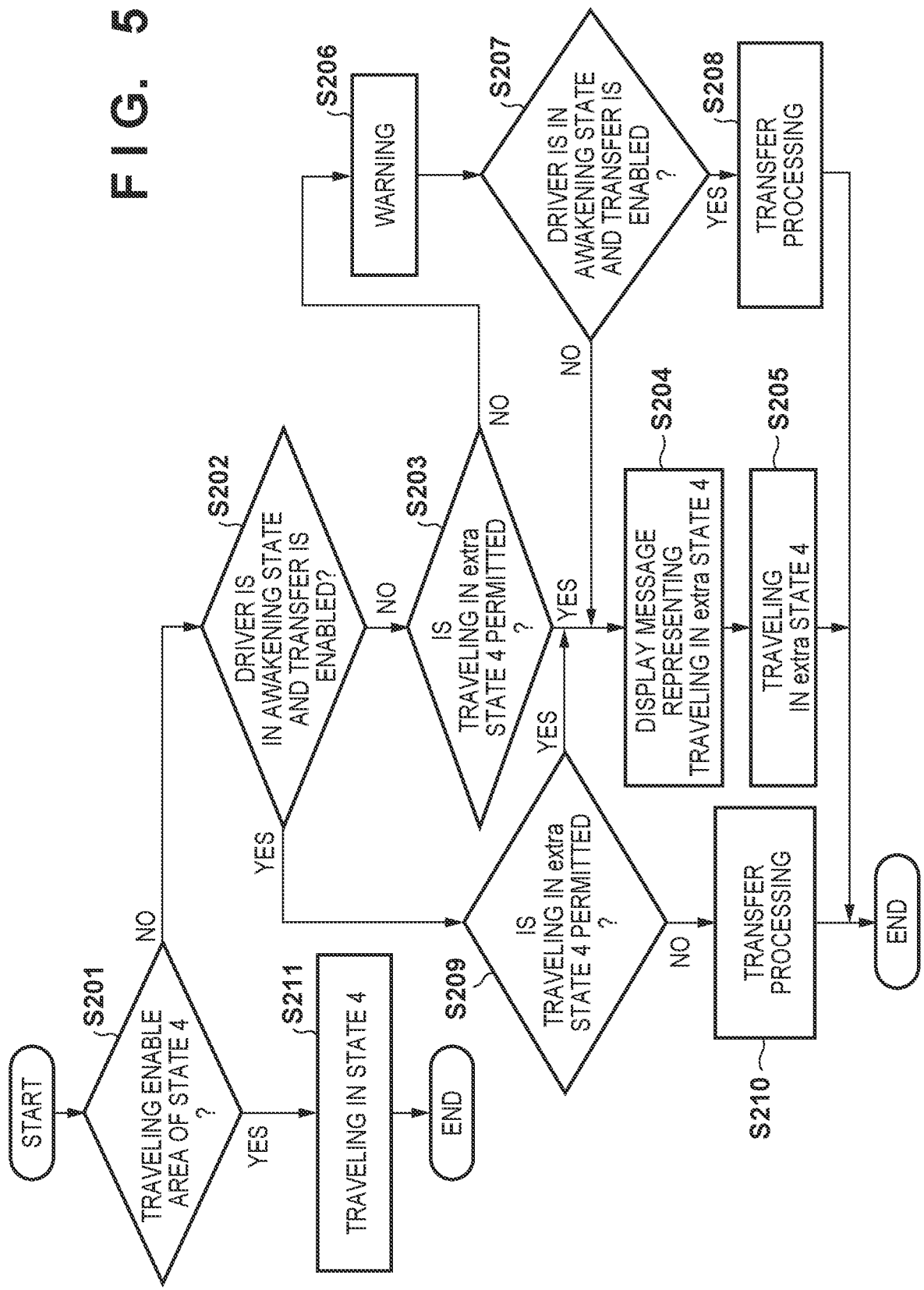
FIG. 5 is a flowchart showing processing executed at the time of traveling in state 4.

FIG. 5 is a flowchart showing processing executed at the time of traveling in the traveling enable area of state 4. The processing shown in FIG. 5 is implemented by, for example, the ECU that forms the control unit 200. Note that at the start of the processing shown in FIG. 5, the driver is in a non-awakening state such as an asleep state.

In step S201, the control unit 200 determines whether the position where the vehicle 1 is currently traveling is the traveling enable area of state 4. In the determination of step S201, whether the area is the traveling enable area of state 4 is determined based on not only the current position of the vehicle 1 but also a predetermined area including the current position of the vehicle 1. Upon determining that the area is the traveling enable area of state 4, in step S211, the control unit 200 continues the traveling in state 4. On the other hand, upon determining that the area is not the traveling enable area of state 4, the process advances to step S202. For example, based on the traveling route of the vehicle 1, if a part of the predetermined area including the current position of the vehicle 1 comes to the traveling enable area of extra state 4, the control unit 200 judges that the vehicle 1 leaves the traveling enable area of state 4 and enters the traveling enable area of extra state 4 soon, and determines in step S201 that the area is not the traveling enable area of state 4.

In step S202, the control unit 200 determines whether the driver is in an awakening state and is in a state in which the driving subject can be transferred. The determination of step S202 is executed based on, for example, the state of the driver recognized by the in-vehicle recognition camera 209 or the in-vehicle recognition sensor 210. Here, upon determining that the driver is in an awakening state and is in a state in which the driving subject can be transferred, the process advances to step S209. Upon determining that the driver is not in an awakening state and is not in a state in which the driving subject can be transferred, the process advances to step S203.

In step S203, the control unit 200 determines whether traveling in extra state 4 is permitted. The determination of step S203 is executed based on, for example, the set contents in the region 1003 of the setting screen 1000. Upon determining in step S203 that traveling in extra state 4 is permitted, the control unit 200 displays a message representing traveling in extra state 4 on a display unit in step S204, and makes traveling control of the vehicle 1 transition from state 4 to extra state 4 in step S205. At the time of transition to extra state 4, the control unit 200 increases the safety margin by, for example, lowering the traveling speed of the vehicle, increasing the distance from another vehicle, or increasing the control level of lane keeping.

As described above, when leaving the traveling enable area of state 4 and entering the traveling enable area of extra state 4, transfer of the driving subject to the driver is not performed. With this arrangement, the driver can continue the non-awakening state such as an asleep state.

Upon determining in step S203 that traveling in extra state 4 is not permitted, in step S206, the control unit 200 issues a warning to the driver. Here, the warning is a warning that makes the driver shift from the non-awakening state to the awakening state, and is, for example, a warning sound from a speaker or pulling of a seatbelt. In step S207, the control unit 200 determines whether the driver is in an awakening state and is in a state in which the driving subject can be transferred. The determination of step S207 is executed based on, for example, the state of the driver recognized by the in-vehicle recognition camera 209 or the in-vehicle recognition sensor 210. Here, upon determining that the driver is in an awakening state and is in a state in which the driving subject can be transferred, in step S208, the control unit 200 performs driving subject transfer processing to the driver. In the transfer processing, for example, the driver is requested to do at least one of steering wheel grip, driving operation, system monitoring, and peripheral environment monitoring. Upon detecting at least one of steering wheel grip, driving operation, system monitoring, and peripheral environment monitoring, the control state of the vehicle 1 is made to transition from state 4 to a state of level equal to or less than state 3.

As described above, when leaving the traveling enable area of state 4 and entering the traveling enable area of extra state 4, if traveling in extra state 4 is not permitted, a warning is issued to the driver. With this arrangement, it is possible to implement traveling control of the vehicle 1 according to the driver's intention not to permit traveling in extra state 4.

Upon determining in step S207 that the driver is not in an awakening state and is not in a state in which the driving subject can be transferred, processing from step S204 is performed. That is, the control unit 200 displays a message representing traveling in extra state 4 on the display unit in step S204, and makes traveling control of the vehicle 1 transition from state 4 to extra state 4 in step S205.

As described above, if the driver does not change to the awakening state even after the warning is issued, the control state of the vehicle 1 is made to transition to extra state 4, thereby increasing the safety of traveling.

The degree of control in extra state 4 may be changed between a case in which the process advances from step S203 to step S204 and a case in which the process advances from step S207 to step S204. For example, the speed of the vehicle 1 in the case in which the process advances from step S207 to step S204 may be controlled to be lower than the speed of the vehicle 1 in the case in which the process advances from step S203 to step S204. In this case, the processing from step S206 may be performed again after the elapse of a predetermined time. With this arrangement, if the driver does not change to the awakening state even after the warning is issued, it is possible to further raise the safety of traveling and also repetitively issue the warning to the driver.

Upon determining in step S202 that the driver is in an awakening state and is in a state in which the driving subject can be transferred, in step S209, the control unit 200 determines whether traveling in extra state 4 is permitted. The determination of step S209 is executed based on, for example, the set contents in the region 1003 of the setting screen 1000. Here, upon determining that traveling in extra state 4 is permitted, processing from step S204 is performed. On the other hand, upon determining that traveling in extra state 4 is not permitted, in step S210, the control unit 200 performs driving subject transfer processing to the driver. In the transfer processing, for example, the driver is requested to do steering wheel grip and the driving operation. Upon detecting steering wheel grip and the driving operation, the control state of the vehicle 1 is made to transition from state 4 to a state of level equal to or less than state 3.

As described above, if the driver is in an awakening state and is in a state in which the driving subject can be transferred, it is possible to implement traveling control of the vehicle 1 according to the driver's intention concerning the possibility of traveling in extra state 4.

In step S209, the following processing may be performed in place of the above-described processing. For example, in step S209, irrelevant to the set contents in the region 1003 of the screen 1000, the control unit 200 may display, on the display device 216, a screen to selectively accept an instruction concerning whether to perform traveling control in extra state 4. That is, in step S209, determination processing may be executed independently of the determination processing of step S203 in a case in which it is determined in step S202 that the driver is not in an awakening state and is not in a state in which the driving subject can be transferred. If an instruction to perform traveling control in extra state 4 is accepted on the screen displayed in step S209, the process advances to step S204. If an instruction not to perform traveling control in extra state 4 is accepted, the process advances to step S210. With this arrangement, if the driver is in an awakening state and is in a state in which the driving subject can be transferred, it is possible to implement traveling control of the vehicle 1 according to the driver's intention at that point of time concerning the possibility of traveling in extra state 4.

Figure 6:
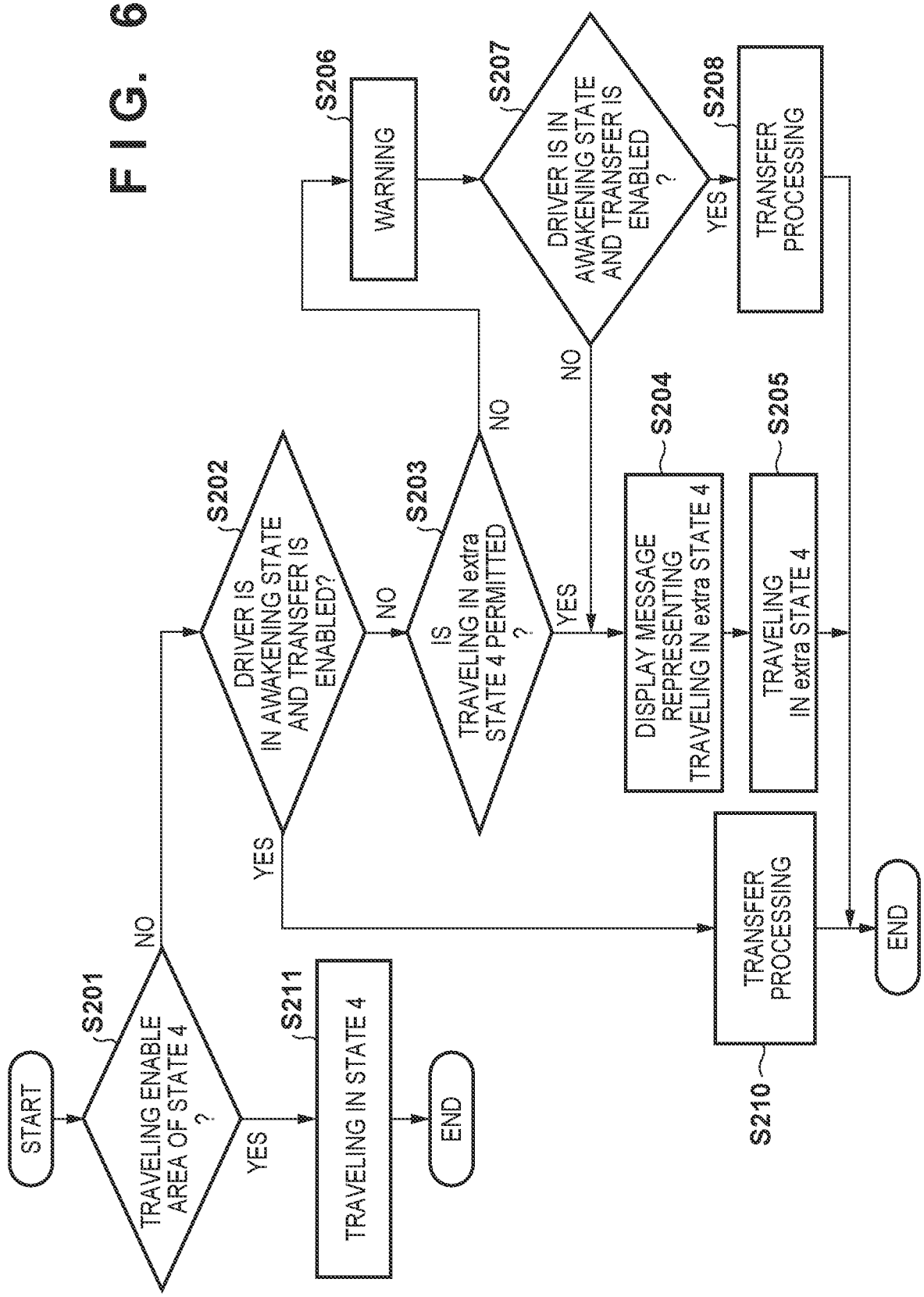
FIG. 6 is a flowchart showing processing executed at the time of traveling in state 4.

FIG. 6 is another flowchart showing processing executed at the time of traveling in the traveling enable area of state 4. FIG. 6 is different from FIG. 5 concerning a case in which it is determined in step S202 that the driver is in an awakening state and is in a state in which the driving subject can be transferred. In FIG. 6, upon determining in step S202 that the driver is in an awakening state and is in a state in which the driving subject can be transferred, the processing of step S210 is directly performed without performing the processing of step S209 described with reference to FIG. 5. With this arrangement, it is possible to smoothly perform the transfer processing to the driver.

Figure 7:
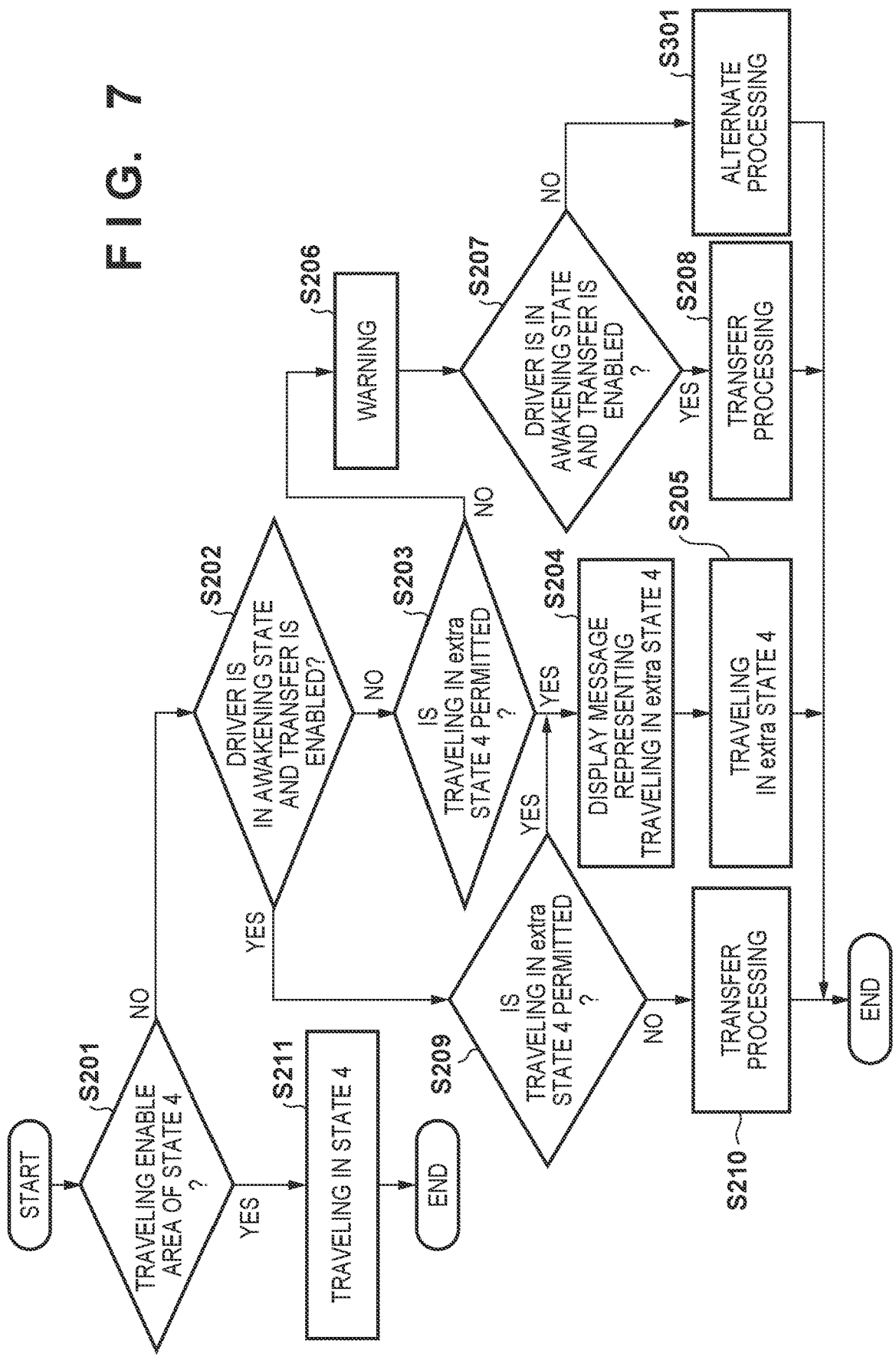
FIG. 7 is a flowchart showing processing executed at the time of traveling in state 4.

FIG. 7 is still another flowchart showing processing executed at the time of traveling in the traveling enable area of state 4. FIG. 7 is different from FIG. 5 concerning a case in which it is determined in step S207 that the driver is not in an awakening state and is not in a state in which the driving subject can be transferred. In FIG. 7, upon determining in step S207 that the driver is not in an awakening state and is not in a state in which the driving subject can be transferred, in step S301, the control unit 200 performs alternate processing shown in FIG. 9.

Figure 9:
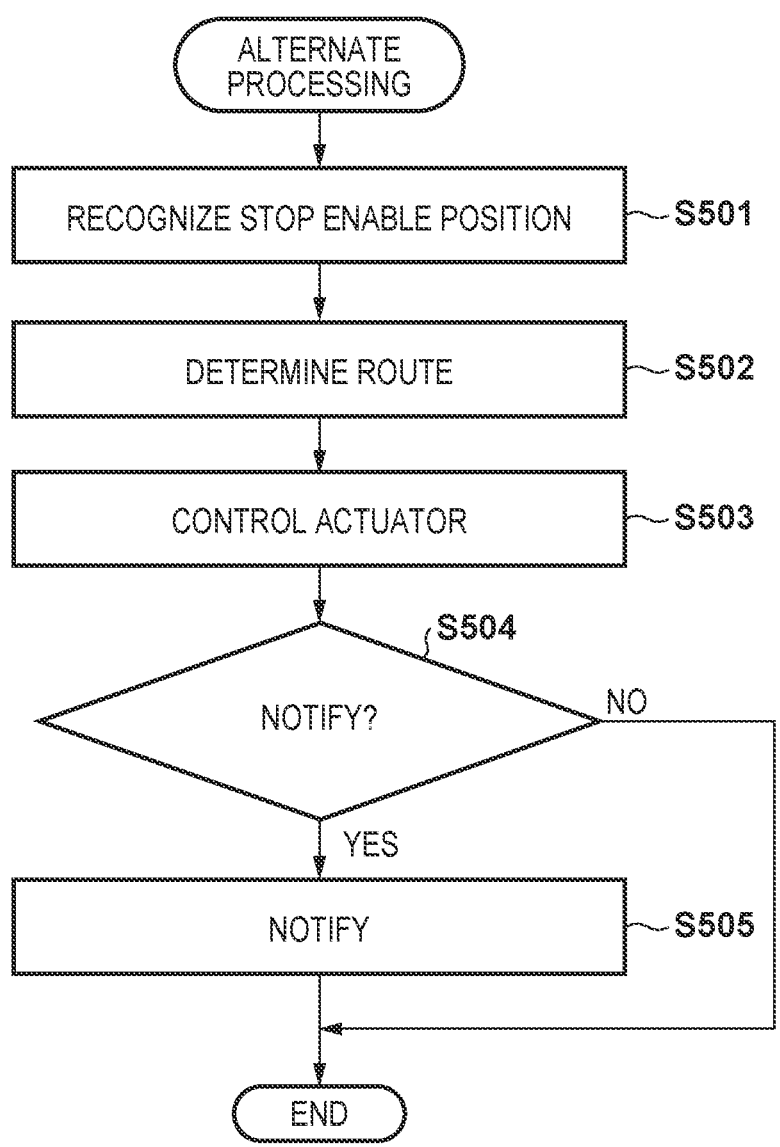
FIG. 9 is a flowchart showing alternate processing.

FIG. 9 is a flowchart showing alternate processing. The processing shown in FIG. 9 is implemented by, for example, the ECU that forms the control unit 200. In step S501, the outside recognition unit 201 recognizes the stop enable position of the vehicle 1. Here, the stop enable position is, for example, an evacuation space on a road shoulder or a parking space. In step S502, the action planning unit 204 judges the optimum route up to the stop enable position recognized in step S501. In step S503, the driving control unit 205 controls the actuators of the driving force output device 212, the steering device 213, the brake device 214, and the like to cause the vehicle 1 to travel up to the stop enable position.

Then, in step S504, the device control unit 206 determines whether to make a notification to the driver. As for the determination of step S504, for example, a designation concerning whether to make a notification to the driver when performing alternate processing is accepted in advance on the setting screen 1000. Upon determining in step S504 to make a notification to the driver, in step S505, the device control unit 206 makes a notification to the driver by voice output to the speaker 215 or pulling of a seatbelt. After step S505, the processing shown in FIG. 9 is ended. On the other hand, upon determining in step S504 not to make a notification to the driver, the processing shown in FIG. 9 is directly ended.

With the arrangement of step S505, in a case in which it is designated in advance to make a notification to the driver after the vehicle 1 is stopped, when the alternate processing is performed, the driver can be set in an awakening state. On the other hand, in a case in which it is designated in advance not to make a notification to the driver after the vehicle 1 is stopped, when the alternate processing is performed, the driver can be kept in a non-awakening state.

Additionally, in step S504, the determination of whether to make a notification to the driver at the time of alternate processing may be controlled in accordance with position information. For example, in a case in which it is designated in advance not to make a notification to the driver at the time of alternate processing, and a parking space of a parking area or service area is recognized as a stop enable position in step S501, a notification to the driver may not be made. In addition, in a case in which it is designated in advance not to make a notification to the driver at the time of alternate processing, and an evacuation space on a road shoulder is recognized as a stop enable position in step S501, a notification to the driver may be made independently of the designation. Furthermore, independently of the designation concerning a notification to the driver at the time of alternate processing, in a case in which an evacuation space on a road shoulder is recognized as a stop enable position in step S501, a notification to the driver may be made.

Figure 8:
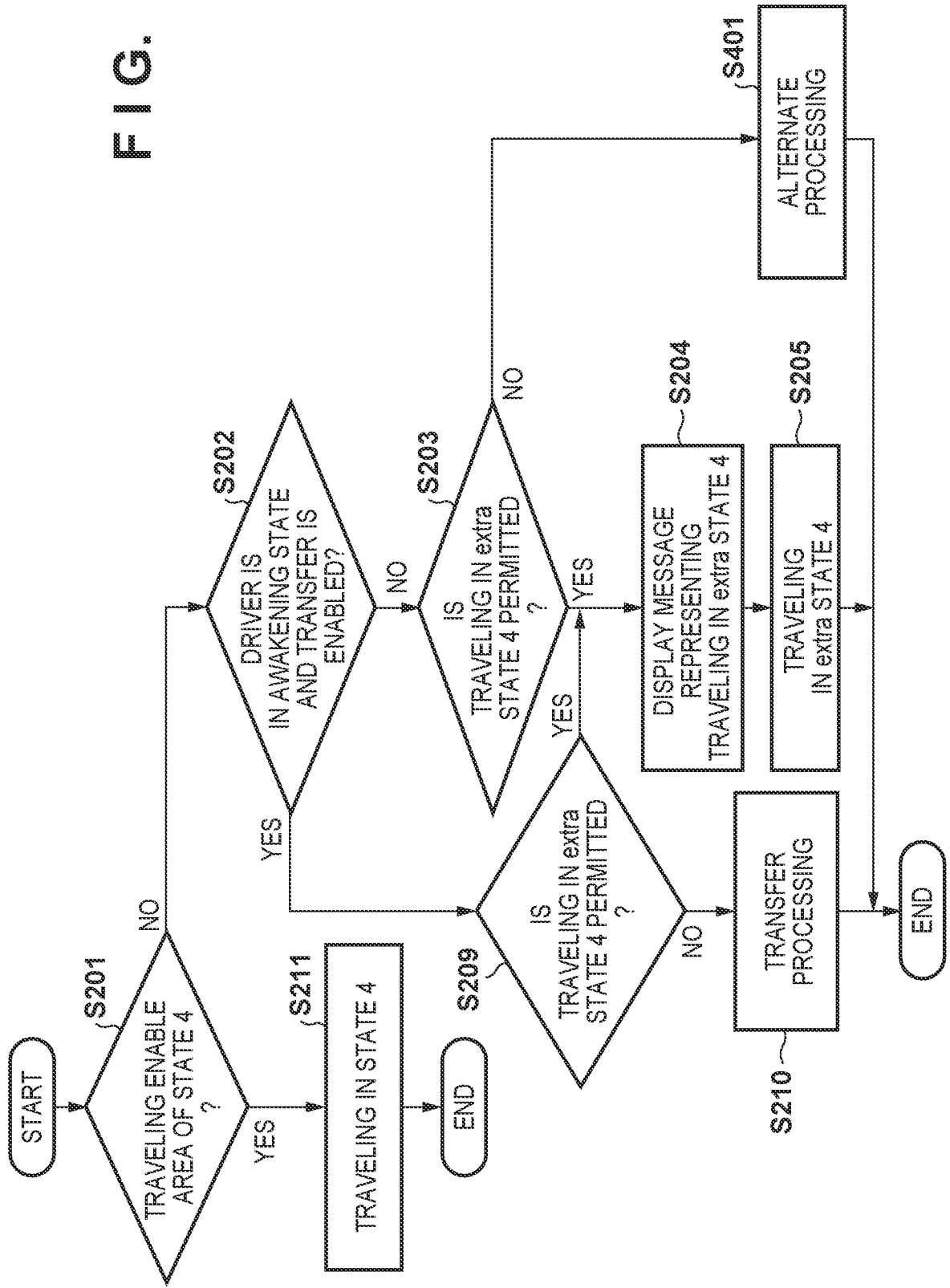
FIG. 8 is a flowchart showing processing executed at the time of traveling in state 4.

FIG. 8 is still another flowchart showing processing executed at the time of traveling in the traveling enable area of state 4. FIG. 8 is different from FIG. 5 concerning a case in which it is determined in step S203 that traveling in extra state 4 is not permitted. In FIG. 8, upon determining in step S203 that traveling in extra state 4 is not permitted, the processing in steps S206 to S208 described with reference to FIG. 5 is not performed, and alternate processing of step S401 is performed. The alternate processing of step S401 is the same as the processing described with reference to FIG. 9. With this arrangement, if it is determined that traveling in extra state 4 is not permitted, the vehicle 1 is immediately stopped at a stop enable position. For this reason, if the driver is not in an awakening state and is not in a state in which the driving subject can be transferred, and traveling in extra state 4 is not permitted, the safety of traveling can be raised.

Summary of Embodiment

A traveling control apparatus according to the above-described embodiment comprises a control unit configured to control traveling of a vehicle to switch between first traveling control (state 4) that does not need monitoring by a driver and second traveling control (extra state 4) that needs monitoring by the driver, and a recognition unit (in-vehicle recognition unit 203) configured to recognize a state of the driver, wherein in a case in which traveling of the vehicle by the first traveling control is impossible, in accordance with a result of recognition by the recognition unit, the control unit performs switching from the first traveling control to the second traveling control, or executes third traveling control of making a safety margin larger than in the first traveling control without switching from the first traveling control to the second traveling control (FIGS. 5, 6, 7, and 8). With this arrangement, the third traveling control can be executed, and the driver can maintain the state at the time of execution of the first traveling control.

Additionally, in a case in which the recognition unit recognizes a non-awakening state of the driver, the control unit executes the third traveling control. The non-awakening state includes an asleep state of the driver. With this arrangement, the driver can maintain, for example, the asleep state.

In addition, the traveling control apparatus further comprises an acceptance unit (1003) configured to accept a designation concerning whether to permit execution of the third traveling control. With this arrangement, it is possible to accept a designation concerning whether to permit execution of the third traveling control, for example, before traveling.

Additionally, in a case in which traveling of the vehicle by the first traveling control is impossible, and the recognition unit recognizes that the driver is in an awakening state in which the driver can perform driving, the control unit performs switching from the first traveling control to the second traveling control, or executes the third traveling control in accordance with the designation accepted by the acceptance unit (FIG. 5, S209). With this arrangement, if the driver is, for example, awake, traveling of the vehicle can be controlled in accordance with the designation accepted in advance.

Additionally, if the acceptance unit accepts a designation to permit execution of the third traveling control in a case in which traveling of the vehicle by the first traveling control is impossible, and the recognition unit recognizes the non-awakening state of the driver, the control unit executes the third traveling control (FIG. 5, S203). With this arrangement, when a designation to permit execution of the third traveling control is accepted, the third traveling control can be executed.

In addition, if the acceptance unit accepts a designation not to permit execution of the third traveling control in the case in which traveling of the vehicle by the first traveling control is impossible, and the recognition unit recognizes the non-awakening state of the driver, the control unit stops the vehicle (FIG. 8, S401). With this arrangement, if a designation not to permit execution of the third traveling control is accepted in a case in which the driver is in, for example, an asleep state, the vehicle can be stopped.

In addition, the traveling control apparatus further comprises a warning unit configured to issue a warning to the driver in the non-awakening state if the acceptance unit accepts a designation not to permit execution of the third traveling control in the case in which traveling of the vehicle by the first traveling control is impossible, and the recognition unit recognizes the non-awakening state of the driver (FIG. 6, S206), and a second recognition unit (in-vehicle recognition unit 203) configured to recognize the state of the driver after the warning is issued by the warning unit, wherein in a case in which the second recognition unit recognizes the non-awakening state of the driver, the control unit executes the third traveling control (S207). With this arrangement, a warning can be issued if the driver is in, for example, an asleep state.

Furthermore, in a case in which the second recognition unit recognizes that the driver is in an awakening state in which the driver can perform driving, the control unit performs switching from the first traveling control to the second traveling control (S208). With this arrangement, if the driver changes to a state in which the driver can drive after a warning is issued, the driving subject can be transferred to the driver.

In addition, traveling sections of the vehicle under the first traveling control and the third traveling control are determined in advance. With this arrangement, the vehicle can be made to travel in the sections where execution of the first traveling control and the third traveling control is permitted.

Additionally, when executing the third traveling control, the control unit increases a safety margin by the first traveling control based on at least one of a speed of the vehicle and a distance between vehicles. With this arrangement, when executing the third traveling control, it is possible to lower the speed of the vehicle and increase the distance between the vehicles.

The present invention is not limited to the above embodiments, and various changes and modifications can be made within the spirit and scope of the present invention.

What is claimed is:

1. A traveling control apparatus comprising:
at least one processor circuit with a memory comprising instructions, that when executed by the processor circuit, causing the processor circuit to at least function as:
a control unit configured to control traveling of a vehicle to switch between first traveling control that does not need monitoring by a driver and second traveling control that needs monitoring by the driver;

a recognition unit configured to recognize a state of the driver, and an acceptance unit configured to accept a user instruction on whether to permit an execution of a third traveling control subsequent to the first traveling control, wherein in traveling by the third traveling control, monitoring by a driver is not needed and a safety margin of the control of the vehicle is greater in the third traveling control than in the first traveling control, wherein in a case in which the vehicle leaves a predetermined area in a state that the first traveling control is performed, and the state of the driver meets a predetermined condition, the control unit transitions from the first traveling control to the second traveling control when the third traveling control is not permitted by the user instruction and the state of the driver changes so as not to meet the predetermined condition, or transitions from the first traveling control to the third traveling control when the execution of the third traveling control is permitted by the user instruction.

2. The apparatus according to claim 1, wherein in a case in which the recognition unit recognizes a non-awakening state of the driver, the state of the driver meets the predetermined condition.

3. The apparatus according to claim 2, wherein the non-awakening state includes an asleep state of the driver.

4. The apparatus according to claim 1, wherein in a case in which the vehicle leaves the predetermined area in a state that the first traveling control is performed, and the state of the driver does not meet the predetermined condition, the control unit transitions from the first traveling control to the second traveling control when the third traveling control is not permitted by the user instruction, or transitions from the first traveling control to the third traveling control when the third traveling control is permitted by the user instruction.

5. The apparatus according to claim 1, wherein if the third traveling control is not permitted by the user instruction, the control unit stops the vehicle instead of determining the state of the driver by a result of a warning.

6. The apparatus according to claim 1, wherein the control unit performs switching from the first traveling control to the third traveling control based on that the third traveling control is not permitted by the user instruction and the state of the driver still meets the predetermined condition even by the warning.

7. The apparatus according to claim 6, wherein in a case in which the state of the driver does not meet the predetermined condition after the warning is issued, the control unit performs switching from the first traveling control to the second traveling control.

8. The apparatus according to claim 1, wherein an area where the vehicle can travel in a state that the third traveling control is performed is determined in advance.

9. The apparatus according to claim 1, wherein when executing the third traveling control, the control unit increases a safety margin by the first traveling control based on at least one of a speed of the vehicle and a distance between vehicles.

10. A traveling control method executed in a traveling control apparatus, comprising:

controlling traveling of a vehicle to switch between first traveling control that does not need monitoring by a driver and second traveling control that needs monitoring by the driver; and recognizing a state of the driver, accepting a user instruction on whether to permit execution of a third traveling control subsequent to the first traveling control, wherein in traveling by the third traveling control, monitoring by a driver is not needed and a safety margin of the control of the vehicle is greater in the third traveling control than in the first traveling control, wherein in a case in which, in controlling the traveling of the vehicle, the vehicle leaves a predetermined area in a state that the first traveling control is performed and the driver meets a predetermined condition, the switching from the first traveling control to the second traveling control is performed based on that the third traveling control is not permitted by the user instruction and the state of the driver changes so as not to meet the predetermined condition, or a switching from the first traveling control to the third traveling control is performed based on that the third traveling control is permitted by the user instruction.

11. A non-transitory computer-readable storage medium storing a program configured to cause a computer to operate to:

control traveling of a vehicle to switch between first traveling control that does not need monitoring by a driver and second traveling control that needs monitoring by the driver; and recognize a state of the driver, obtain a user instruction on whether to permit execution of a third traveling control subsequent to the first traveling control, wherein in traveling by the third traveling control, monitoring by a driver is not needed and a safety margin of the control of the vehicle is greater in the third traveling control than in the first traveling control, wherein in a case in which, in controlling the traveling of the vehicle, the vehicle leaves a predetermined area in a state that the first traveling control is performed and the driver meets a predetermined condition, the switching from the first traveling control to the second traveling control is performed based on that the third traveling control is not permitted by the user instruction and the state of the driver changes so as not to meet the predetermined condition, or a switching from the first traveling control to the third traveling control is performed based on that the third traveling control is permitted by the user instruction.

* * * * *